(12) United States Patent
Jeon et al.

(10) Patent No.: US 8,259,798 B2
(45) Date of Patent: Sep. 4, 2012

(54) DISTRIBUTED VIDEO ENCODER AND DECODER AND DISTRIBUTED VIDEO DECODING METHOD

(75) Inventors: Byeung-Woo Jeon, Seongnam-si (KR); Jong-Bin Park, Jeollanam-do (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 343 days.

(21) Appl. No.: 12/585,835

(22) Filed: Sep. 25, 2009

(65) Prior Publication Data
US 2010/0080289 A1 Apr. 1, 2010

(30) Foreign Application Priority Data
Sep. 26, 2008 (KR) .................. 10-2008-0094709

(51) Int. Cl.
H04N 7/12 (2006.01)
(52) U.S. Cl. ................ 375/240.1; 375/240.03

(58) Field of Classification Search .......... 370/485–487; 375/240.03, 240.1, 240.22, 240.23, 245, 375/246, 240.25, 240.16; 382/236, 243
See application file for complete search history.

(56) References Cited

U.S. PATENT DOCUMENTS
7,602,851 B2 * 10/2009 Lee et al. ............... 375/240.25
2009/0316797 A1 * 12/2009 Woo et al. ............... 375/240.25

OTHER PUBLICATIONS
"Wyner-Ziv Coding for Video: Applications to Compression and Error Resilience", Anne Aaron et al., 2003.

* cited by examiner

Primary Examiner — Hanh Nguyen
(74) Attorney, Agent, or Firm — Harness, Dickey & Pierce, P.L.C.

(57) ABSTRACT

A distributed video encoder and decoder and a distributed video decoding method using adaptive quantization are provided. Adaptive quantization is performed at the time of encoding and decoding so that limited resources and information can be efficiently used, and a predetermined bit which is previously defined is included in a position of a bit which does not need to be transmitted for channel coding, thereby improving a bit rate-distortion performance as a whole.

5 Claims, 13 Drawing Sheets

DISTRIBUTED VIDEO ENCODER AND DECODER AND DISTRIBUTED VIDEO DECODING METHOD

CLAIM FOR PRIORITY

This application claims priority to Korean Patent Application No. 10-2008-0094709 filed on Sep. 26, 2008 in the Korean Intellectual Property Office (KIPO), the entire contents of which are hereby incorporated by reference.

BACKGROUND

1. Technical Field

Example embodiments of the present invention relates in general to a distributed video encoder and decoder and a distributed video decoding method and more specifically to a distributed video encoder and decoder and a distributed video decoding method using an adaptive quantization.

2. Description of the Related Art

Digital video data used in video conferences, video on demands (VODs), digital broadcasting receivers, and cable televisions (CATVs) commonly has a large amount of data, and thus it is not used "as is" but compressed by an efficient compression technique.

Examples of representative video compression techniques include MPEG-4 video coding and MPEG-4 AVC/H.264. The techniques are usually employed in video players, VODs, video conferences, digital multimedia broadcasting (DMB). Due to the development of wireless communication such as 2.5 G and 3 G communications, the techniques are recently employed for video transmission in wireless mobile environments.

In order to compress digital video data, a method of reducing temporal redundancy, a method of reducing spatial redundancy, and method of reducing statistical redundancy of generated codes are usually used. The method of reducing temporal redundancy is a motion estimation and compensation technique.

Existing coding techniques remove temporal redundancy to achieve high coding efficiency. However, since a part which occupies the highest computation cost in a moving picture encoder is the motion estimation and compensation technique, it is very important to reduce complexity of the encoder in a limited source environment such as a sensor network.

A distributed source coding (DSC) technique based on a Slepian-Wolf theorem is highlighted as one of methods of resolving the complexity problem of the encoder. The Slepian-Wolf theorem mathematically proved that even though correlated sources are separately encoded, if the encoded data are jointly decoded, a coding gain of up to the same degree as that obtained by predictive-coding the respective sources together can be obtained.

A distributed video coding (DVC) technique is one which the distributed source coding technique of lossless compression is expanded to a case of lossy compression and is based on a Wyner-Ziv theorem in which the Slepian-Wolf theorem which is a theoretical base of the distributed source coding technique is expanded to a case of lossy compression.

From a point of view of a video coding technique, it is meant that, in both techniques, processing such as motion estimation and compensation performed to reduce inter-picture redundancy can be implemented in a decoder side without any coding gain loss.

The distributed video coding technique is described in Anne Aaron, Shantanu Rane, Rui Zhang, Bernd Girod, "Wyner-Ziv Coding for Video: Applications to Compression and Error Resilience," Proc., IEEE Data Compression Conference (DCC '03), pp. 93-102, 2003. In the distributed video coding technique, a decoder uses similarity between neighboring pictures to generate side information for a current picture. The side information is regarded as what noise of a virtual channel is added to the current picture which has to be reconstructed, and the current picture is reconstructed by removing the noise in the side information using a channel code transmitted from an encoder.

FIG. 1 is a block diagram illustrating a configuration of an encoder 110 and a decoder 130 according to the conventional Wyner-Ziv coding technique.

As illustrated in FIG. 1, the encoder 110 according to the conventional Wyner-Ziv coding technique includes a block unit dividing unit 111, a quantization unit 112, a channel code encoding unit 113, and a key picture encoding unit 114. The decoder 130 includes a channel decoding unit 131, a video reconstruction unit 132, a key picture decoding unit 133, and a side information generating unit 134.

The encoder 110 according to the Wyner-Ziv coding technique classifies pictures to be encoded into two types. One is a picture (hereinafter, referred to as a "WZ picture") which is Wyner-Ziv coded using channel code encoding, and the other is a picture (hereinafter, referred to as a "key picture") which is encoded by a conventional coding technique such as H.264/MPEG-4 AVC.

The key picture encoding unit 114 encodes key pictures by a predetermined method selected by a user such as intra picture coding of H.264/MPEG-4 AVC and transmits the encoded key pictures to the decoder 130.

The key picture decoding unit 133 of the decoder 130 reconstructs the key picture which has been encoded by a predetermined method, and the side information generating unit 134 generates side information corresponding to the WZ picture using the key picture reconstructed by the key picture decoding unit 133.

The side information generating unit 134 generates the side information corresponding to the WZ picture to be reconstructed by using an interpolation technique of assuming a linear motion between pictures located before and after the WZ picture.

In order to encode the WZ picture, the block unit dividing unit 111 of the encoder 110 divides the input WZ picture into predetermined coding units. The quantization unit 112 performs quantization of coding units divided by the block unit dividing unit 111. The channel code encoding unit 113 generates parity bits for quantized values using a channel code. The generated parity bits are stored in a parity buffer (not illustrated) and then sequentially transmitted according to a request of the decoder 130 through a feed-back channel.

The channel code decoding unit 131 of FIG. 1 receives the parity bits transmitted from the encoder 110 to estimate the quantized values. The video reconstruction unit 132 of FIG. 1 receives the quantized values estimated by the channel code decoding unit 131 and dequantizes or inverse-quantizes the quantized values to reconstruct the WZ picture.

Ambiguity occurring at the time of dequantization can be resolved with reference to the side information input from the side information generating unit 134. This is described in detail in Anne Aaron, Shantanu Rane, Rui Zhang, Bernd Girod, "Wyner-Ziv Coding for Video: Applications to Compression and Error Resilience," Proc., IEEE Data Compression Conference (DCC '03), pp. 93-102, 2003.

FIG. 2 is a block diagram illustrating a configuration of the channel code decoding unit 131 according to the Wyner-Ziv coding technique.

As illustrated in FIG. 2, the channel code decoding unit 131 includes soft-input soft-out (SISO) decoding units 210a and 210b, channel probability value computing units 211a and 211b, interleavers 213a and 213b, de-interleavers 214a and 214b, a DEMUX 215, and a determination unit 216.

Parity bit data which includes the parity bits for the quantized values transmitted from the encoder 110 and parity bits for values obtained by interleaving the parity bits is divided by the DEMUX 215 into two and input to the channel probability value computing units 211a and 211b, respectively.

Each of the channel probability computing units 211a and 211b receives a probability statistical characteristic for side information and noise, and the parity bits transmitted from the encoder 110 to compute a channel probability value.

Each of the SISO decoding units 210a and 210b performs decoding based on the channel probability value and A Priori Probability (APrP) value received from the other SISO decoding unit 210a or 210b. Each of the SISO decoding units 210a and 210b computes a forward state matrix from a transition matrix while proceeding from an initial state to a last state on a trellis and a backward state matrix while proceeding in an opposite direction when it arrives at the last state. A Posteriori Probability (APoP) value and an extrinsic probability value are computed using the state matrix value and the transition matrix value.

The determination unit 216 computes an error rate using the APoP value. When the error rate is equal to or less than a threshold value, decoding is finished, while when the error rate is more than the threshold value, the other SISO decoding unit 210a or 210b repeats the above-described process. However, when the error rate is not equal to or less than the threshold value even after repeating the process, the decoder 130 may request the encoder 110 to provide additional parity data through the feed-back channel.

FIG. 3 is a block diagram illustrating another configuration of the channel code decoding unit 131 according to the Wyner-Ziv coding technique of FIG. 1.

As illustrated in FIG. 3, a low density parity check code (LDPC) channel code decoder 300 includes a log likelihood ratio (LLR) computing unit 301 and an LDPC decoding unit 302. The LDPC was invented by Robert Gallager at MIT in 1963, and is an error correction code which has a low density check matrix since the number of 1 s in a check matrix of a code is smaller than a length of a code word, is very close to a theoretical limit of Shannon, and has excellent coding performance.

A belief propagation (BP) algorithm may be used for LDPC decoding. Side information, parity data and channel error estimation information for the side information are needed for LDPC decoding. The side information is information having similarity to original information and input to the LLR computing unit 301 and the LDPC decoding unit 302.

The parity data is information which is generated by LDPC channel coding by using the original information as an input and input to the LDPC decoding unit 302 of the LDPC channel code decoder 300. The channel error estimation information for the side information represents how much the side information is similar to the original information by using a numerical method and is input to the LLR computing unit 301. The LDPC channel code decoder 300 receives the inputs, and finally decodes and outputs quantized WZ picture data.

The channel error estimation information for the side information may be expressed by a conditional probability P(X=0|Y=y) or P(Y=1|Y=y) in which a value to be channel-decoded is to be "0" or "1" when the side information is given as a conditional event. Here, Y denotes the side information, and X denotes a value to be channel-decoded. The conditional probability value is needed for computation of an LLR value and thus is input to the LDPC channel code decoder 300 as the channel code estimation information for the side information. The LLR value may be computed using the conditional probability value as in Equation 1. Of course, the LLR value may be computed by a method other than Equation 1.

$$LLR = \log \frac{P(X=0 \mid Y=y)}{P(X=1 \mid Y=y)}. \quad \text{Equation 1}$$

When the LLR value computed by Equation 1 is zero, it is very difficult to determine whether a bit of X is 0 or 1. When the LLR value is a positive value, a probability that X will be 0 is high, while when the LLR value is a negative value, a probability that X will be 1 is high.

FIG. 4 is a view illustrating an operation of the quantization unit 112 according to the Wyner-Ziv coding technique.

A conventional quantization method according to the Wyner-Ziv coding technique performs the same quantization on all areas of a given image. Typically, an image is divided in blocks, quantization by the same strength is performed for the respective blocks, and the quantized blocks are processed in units of bit planes. FIG. 4 two-dimensionally represents the quantization result using a block index which identifies a block in a given image and a bit plane index which identifies a bit plane. Quantization may be applied to pixel values or coefficients generated by a predetermined transform such as discrete cosine transform (DCT). In FIG. 4, a block index means an index which indicates blocks configured by pixels when transform is not performed and an index which indicates blocks configured by transform coefficients when transform is performed (blocks in which transform is performed are not illustrated in FIG. 4). Colored quadrangles represent bits, which are to be transmitted, which will not be discarded after quantization, and non-colored quadrangles represent bits which correspond to information to be discarded after quantization. A portion defined by a dotted line represents a channel coding message which is configured by bits of respective blocks to be channel-coded. As illustrated in FIG. 4, the conventional quantization method has a problem in that quantization by the same strength is applied to all areas of a given image and thus the respective bit planes are the same in number of bits to be transmitted. This is to use a channel coding method of the same code rate in all bit planes to be encoded.

However, since areas in an image of an actual video signal are different in statistical characteristic, when quantization by the same strength is performed for an overall given image as in the conventional method, coding performance deteriorates. For example, this is because a certain area in an image which needs to be encoded may be an object in which a motion is large, but a large number of static areas may be included.

SUMMARY

Accordingly, example embodiments of the present invention are provided to substantially obviate one or more problems due to limitations and disadvantages of the related art.

Example embodiments of the present invention provide a distributed video encoder and decoder and a distributed vide decoding method in which adaptive quantization is performed so that limited resources and information can be efficiently used, and a predetermined bit which is previously defined is included in a position of a bit which does not need to be transmitted for channel coding, thereby improving a bit rate-distortion performance as a whole.

In some example embodiments, a distributed video encoder, includes: a key picture encoding unit which encodes a key picture and outputs the encoded key picture; a block unit dividing unit which divides a WZ picture into predetermined coding units; an adaptive quantization processing unit which determines quantization strength of each area using coding unit information; an adaptive quantization unit which performs quantization of coding unit information output from the block unit dividing unit with the determined quantization strength of each area; and a channel code encoding unit which channel-codes the quantized information and outputs parity.

In other example embodiments, a distributed video decoder, includes: a key picture decoding unit which decodes an encoded key picture and outputs a decoded key picture; a side information generating unit which generates side information using the decoded key picture; an adaptive quantization processing unit which determines quantization strength of each area using the side information input from the side information generating unit; a channel code decoding unit which estimates a quantized value using the side information generated by the side information generating unit, the quantization strength determined by the adaptive quantization strength processing unit, and a parity bit input from the outside; an adaptive quantization unit which computes a quantized value using the quantization strength of each area and the estimated quantized value; and a video reconstruction unit which reconstructs a WZ picture using the computed quantized value, the quantization strength of each area, and the side information.

In still other example embodiments, a distributed video decoding method, includes: receiving a parity signal and an encoded key picture; decoding the encoded key picture and outputting a decoded key picture; generating side information using the decoded key picture; determining quantization strength of each area for adaptive quantization using the side information; estimating a quantized value using the side information, the quantization strength, the parity signal; computing a quantized value using the quantization strength of each area and the estimated quantized value; and reconstructing a WZ picture using the computed quantized value, the quantization strength of each area, and the side information.

BRIEF DESCRIPTION OF THE DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

Figure 1:
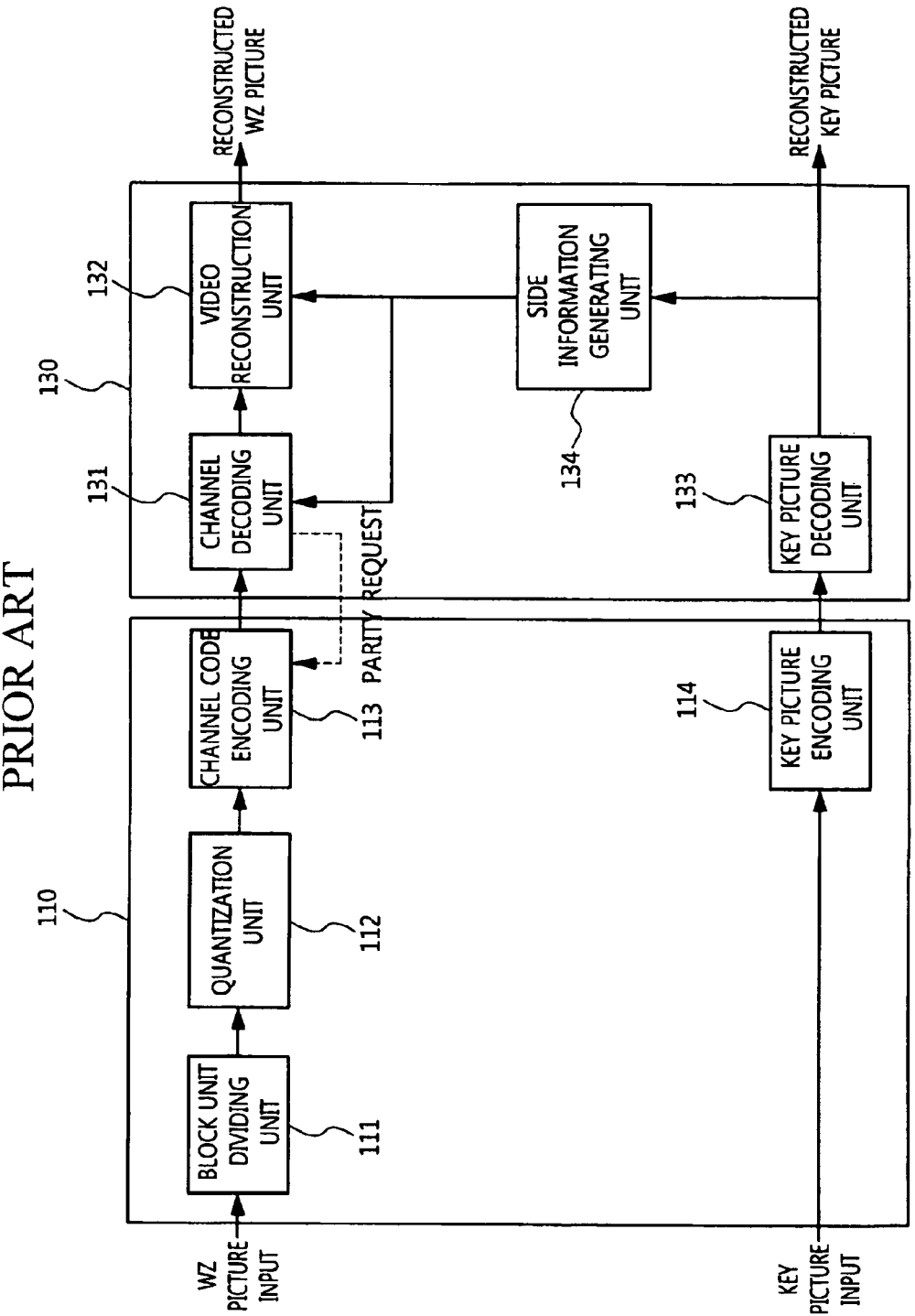
FIG. 1 is a block diagram illustrating a configuration of an encoder and a decoder according to a conventional Wyner-Ziv coding technique.
Figure 2:
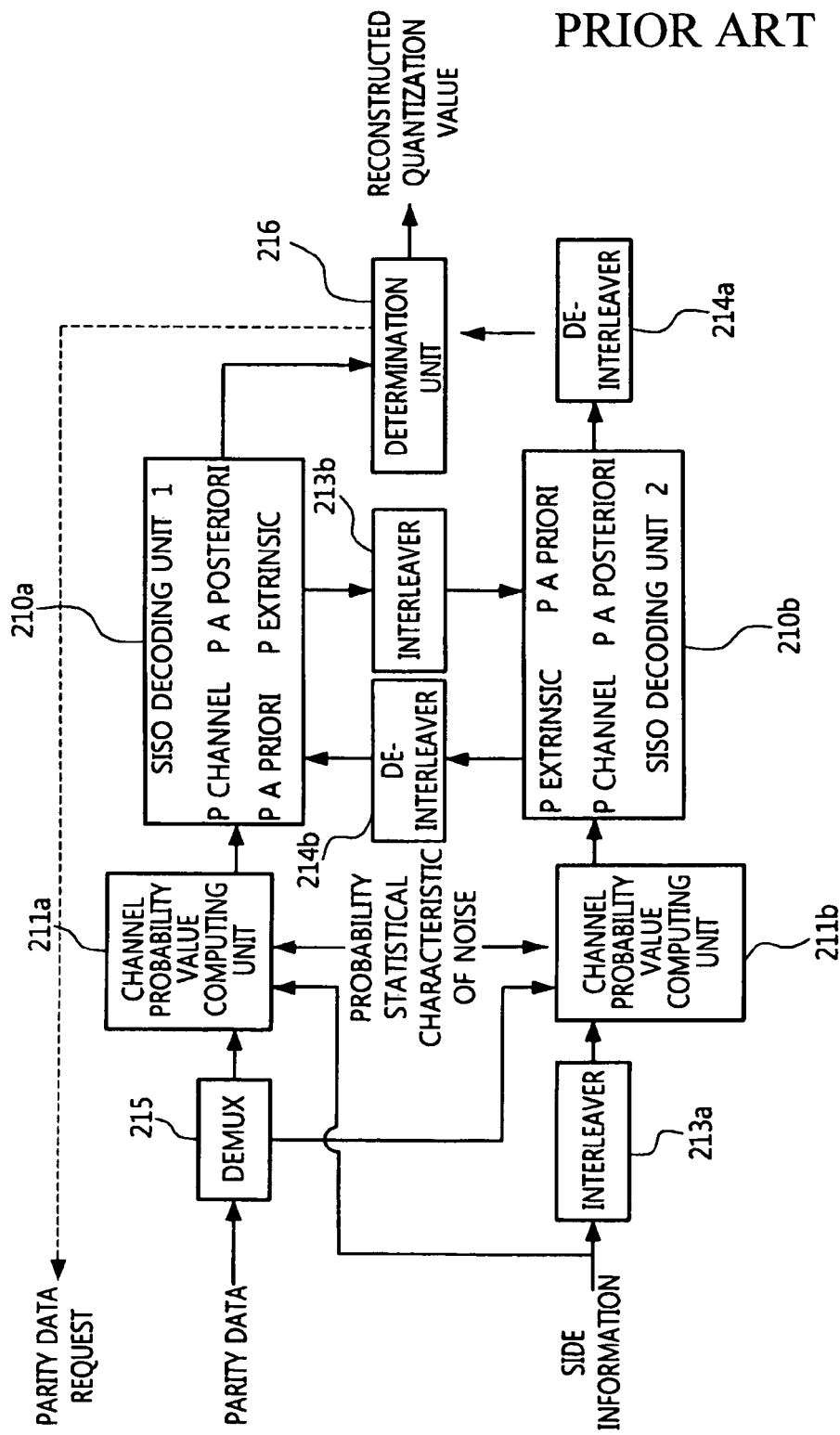
FIG. 2 is a block diagram illustrating a configuration of a channel code decoding unit according to the Wyner-Ziv coding technique of FIG. 1.
Figure 3:
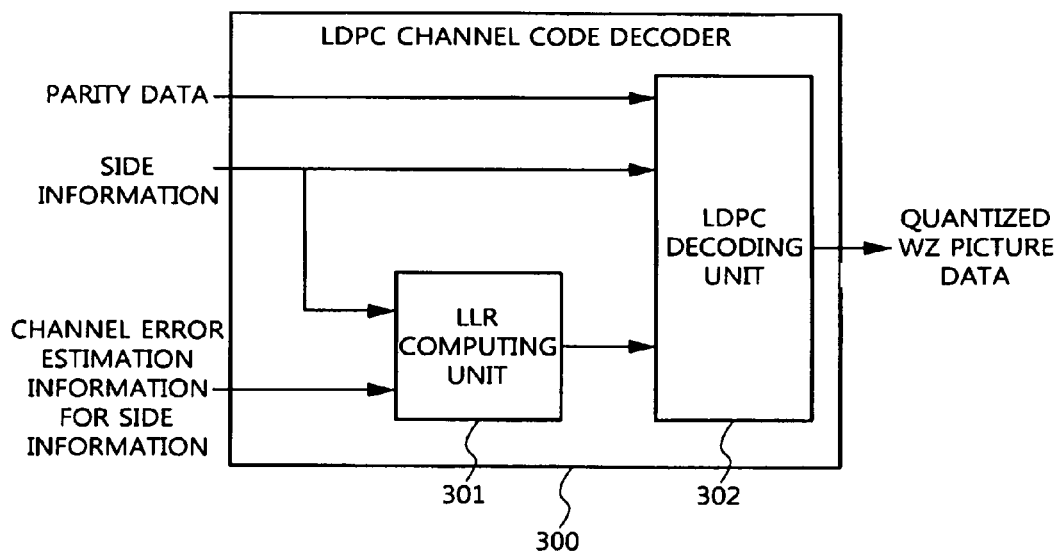
FIG. 3 is a block diagram illustrating another configuration of the channel code decoding unit according to the Wyner-Ziv coding technique of FIG. 1.
Figure 4:
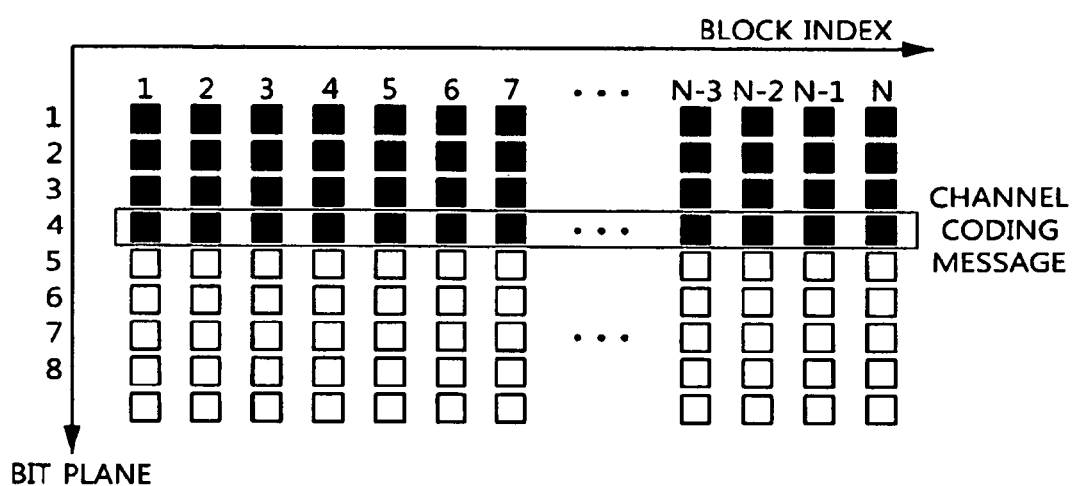
FIG. 4 is a view illustrating an operation of a quantization unit according to the Wyner-Ziv coding technique of FIG. 1.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Figure 5:
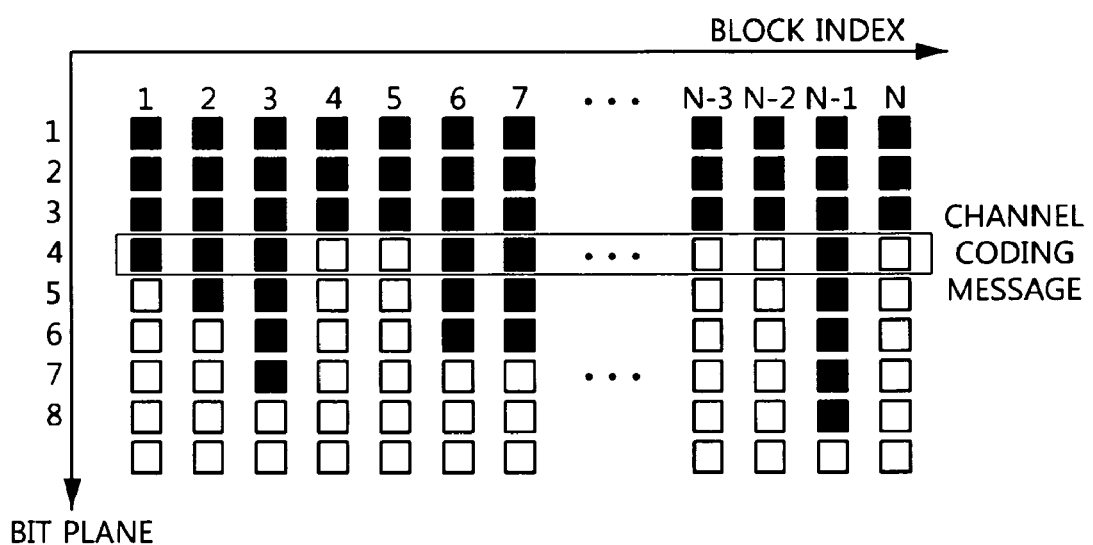
FIG. 5 is a view illustrating a concept of performing adaptive quantization in a Wyner-Ziv coding technique according to an exemplary embodiment of the present invention.

In order to resolve the problem in that the coding performance deteriorates due to various image characteristics, an adaptive quantization method for Wyner-Ziv coding in which adaptive quantization is performed for each area to allocate an appropriate bit may be used as illustrated in FIG. 5.

FIG. 5 is a view illustrating a concept of performing adaptive quantization in a Wyner-Ziv coding technique according to an exemplary embodiment of the present invention.

When the method of FIG. 5 is used, appropriate quantization strength may be allocated according to a characteristic of each image area. However, in this case, a length of a channel coding message is changed from bit plane to bit plane, and thus there is a problem in that the existing channel coding method having the same code rate cannot be used. In order to resolve the problem, location information of bits to be transmitted is recorded, all bits to be transmitted are then bound into one bit string, the bit string is divided into predetermined lengths and channel-coded. Channel decoding is performed by the reverse process.

However, this method has a disadvantage in that an alignment process of bits is frequently required for encoding and decoding. Further, when bits of different bit planes are combined into one, there occurs a problem in that dispersion of the channel error rate in a message to be channel-coded is large. When a channel coding method in which dispersion of the channel error rate is large or performance is reduced due to a burst error is used, a performance may deteriorate. Further, when bits are bound into one string and then divided, decoding cannot be performed in units of bit planes, and mutual information cannot be used. Therefore, there occurs a problem in that more parity data is required at the time of decoding.

For the reasons, a technique of being capable of using a channel coding method of a fixed length code rate while performing adaptive quantization for each image area and performing channel coding in a bit plane unit is needed.

Figure 6:
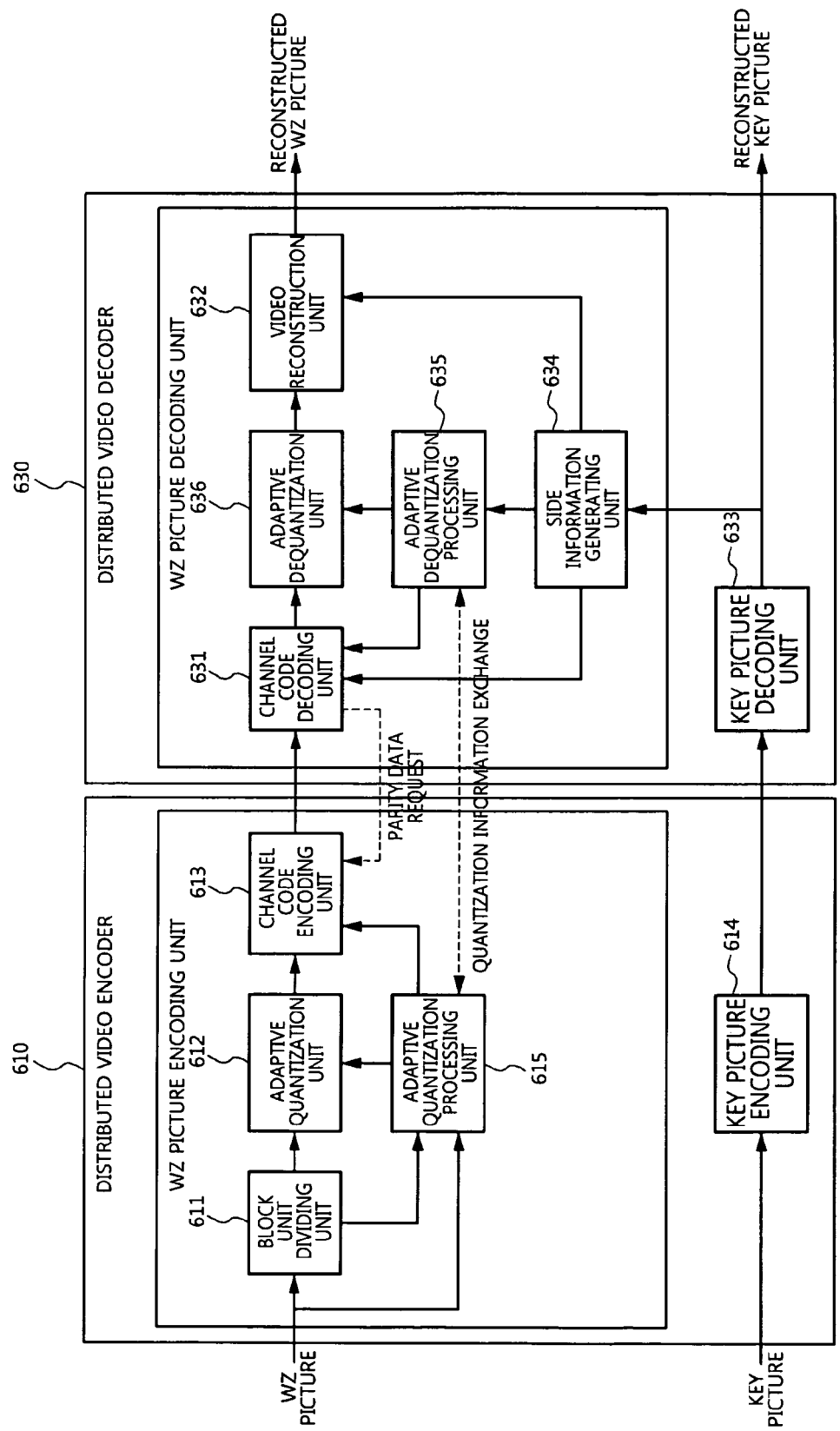
FIG. 6 is a block diagram illustrating a distributed video encoder and a distributed video decoder according to an exemplary embodiment of the present invention.

FIG. 6 is a block diagram illustrating a distributed video encoder and a distributed video decoder according to an exemplary embodiment of the present invention.

Referring to FIG. 6, a distributed video encoder 610 of the present invention includes a block unit dividing unit 611, an adaptive quantization unit 612, a channel code encoding unit 613, a key picture encoding unit 614, and an adaptive quantization processing unit 615. A distributed video decoder 630 includes a channel code decoding unit 631, a video reconstruction unit 632, a key picture decoding unit 633, a side information generating unit 634, an adaptive dequantization processing unit 635, and an adaptive dequantization unit 636.

The key picture encoding unit 614 receives and encodes key pictures. On the contrary, the key picture decoding unit 633 reconstructs key pictures using information received from the key picture encoding unit 614. The side information generating unit 634 generates side information for a current WZ picture which is to be reconstructed by using the reconstructed key pictures.

The block unit dividing unit 611 of the encoder 610 divides an input WZ picture into predetermined coding units.

The adaptive quantization processing unit 615 determines quantization strength of each area using WZ picture input information and coding unit information output from the block unit dividing unit 611. The adaptive quantization processing unit 615 may determine quantization strength of each area using the WZ picture input information, coding unit information from the block unit dividing unit 611, and additional information received through communication with the adaptive dequantization processing unit 635 of the distributed video decoder 630.

The adaptive dequantization processing unit 635 of the distributed video decoder 630 determines quantization strength of each area for adaptive dequantization at the time of decoding by using side information input from the side information generating unit 634 and information received from the adaptive quantization processing unit 615 of the distributed video encoder 610.

The adaptive quantization processing unit 615 and the adaptive dequantization processing unit 635 may use one of the following methods to determine quantization strength. As a first method, the encoder 610 determines and uses quantization strength and transmits the quantization strength value to the decoder 630, and the decoder 630 uses the quantization strength value. As a second method, the decoder 630 determines and uses quantization strength and transmits the quantization strength value to the encoder 610, and the encoder 610 uses the quantization strength value. As a third method, the encoder 610 and the decoder 630 simultaneously exchanges mutual information to determine quantization strength, and the quantization strength value is used by both the encoder 610 and the decoder 630.

The adaptive quantization unit 612 of the encoder 610 performs quantization of coding unit information output from the block unit dividing unit 611 with the quantization strength determined by the above-describe method.

The channel code encoding unit 613 receives and channel-codes adaptive-quantized information and quantization strength information and generates parity. At this time, since adaptive quantization is performed, bits input to the channel code encoding unit 613 do not have a fixed length, and bits to be transmitted are mixed with bits which do not need to be transmitted, as illustrated in FIG. 5.

In order to handle this problem, positions (hereinafter, referred to as "quantization discard positions") of bits which do not need to be transmitted are filled with bits which are previously defined without changing bits to be transmitted. Even though this process is performed, there is an advantage from a point of view of bits to be transmitted, and the reason will be described later.

The channel code decoding unit 631 of the distributed video decoder 630 estimates quantized values by using the side information input from the side information generating unit 634, the parity data received from the distributed video encoder 610, and the quantization strength information.

The adaptive dequantization unit 636 dequantizes the quantized values estimated by the channel code decoding unit 631 by using the quantization strength received from the adaptive dequantization processing unit 635 and outputs dequantized values.

The video reconstruction unit 632 reconstructs the WZ picture using the dequantized values output from the adaptive dequantization unit 636 and the side information. The video reconstruction unit 632 may be configured to further be input by the quantization strength.

When it is determined that it is difficult to estimate reliable quantized values while performing channel code decoding, the channel code decoding unit 631 of FIG. 6 requests the distributed video encoder 610 to provide the parity data within a predetermined limitation until reliable estimation is possible and receives the parity data.

In this case, since only a parity amount necessary for decoding is received from the distributed video encoder 610, it is efficient from a point of view of bit-rate reduction. This process can be performed when a revere channel (a feed-back channel) for requesting the parity bit is present.

In order to mitigate the problem, according to a user's configuration the channel code decoding unit 631 may be configured to receive the parity data at a time without requesting a predetermined parity amount at each time via the reverse channel.

Further, the channel code decoding unit 631 may be configured to additionally request information of the parity data when it is determined that reliability is low even after all information of the received parity data are exhausted.

Further, under the assumption that the reverse channel is not used, the distributed video encoder 610 may be configured to transmit a certain parity amount at certain time interval which is previously set to the decoder 630, and the decoder 630 may be configured not to request the parity data.

Further, a turbo code or an LDPC channel code which is proven as nearly reaching the Shannon limit is preferably used as a channel code used in the channel code decoding unit 631. The person skilled in the art can understand that other channel codes which are excellent in coding efficiency and error correction may be used.

Figure 7:
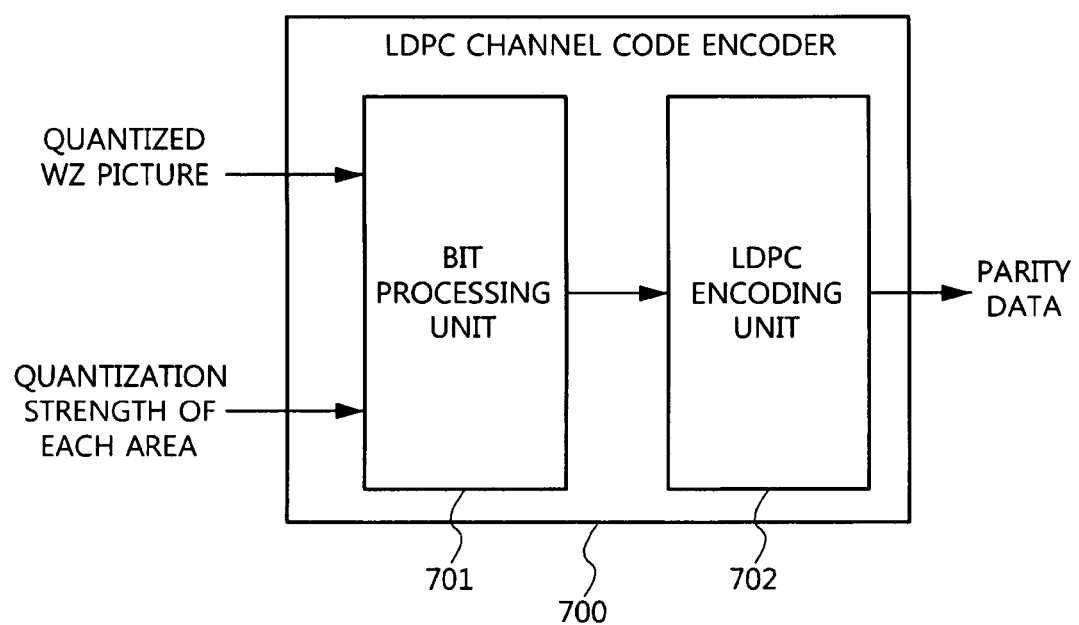
FIG. 7 is a block diagram illustrating a configuration of an LDPC encoder for encoding adaptively quantized bits.

FIG. 7 is a block diagram illustrating a configuration of an LDPC encoder for encoding adaptively quantized bits by using an LDPC technique.

As illustrated in FIG. 7, the LDPC channel code encoder 700 may include a bit processing unit 701 and an LDPC encoding unit 702.

Information in which the WZ picture is quantized and quantization strength information of each area are input to the LDPC encoder 700. The bit processing unit 701 receives the quantized WZ picture and the quantization strength of each area and replaces bits of quantization discard positions among quantized WZ picture data with previously defined predetermined value such as 0 or 1. Thereafter, the LDPC coding unit 702 channel-codes the quantized WZ picture and generates parity data.

Figure 8:
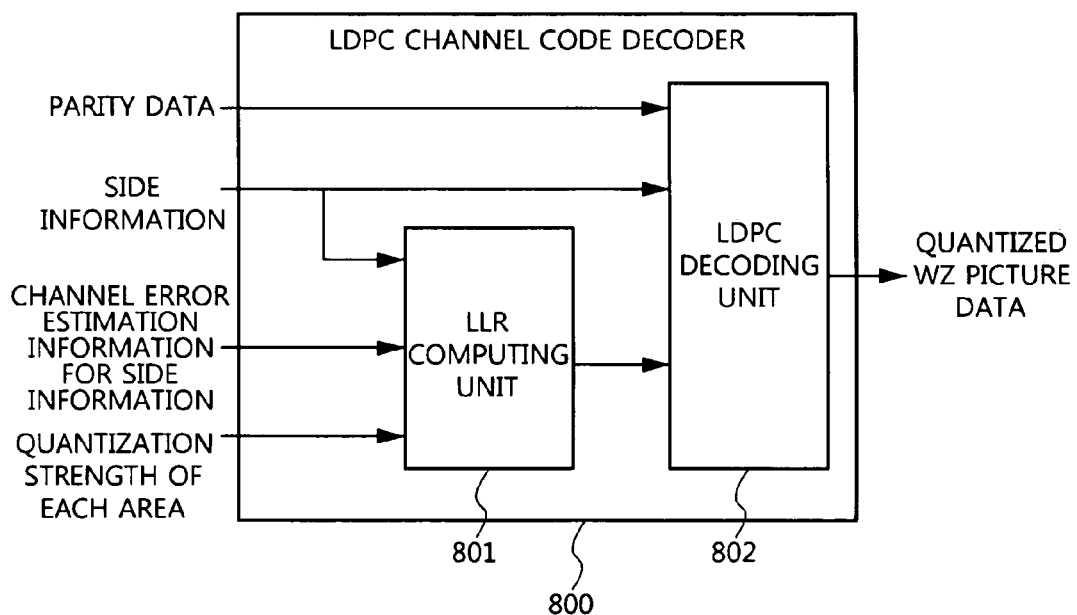
FIG. 8 is a block diagram illustrating a configuration of an LDPC channel code decoder for channel code-decoding parity data using side information.

FIG. 8 is a block diagram illustrating a configuration of an LDPC channel code decoder for channel code-decoding the parity data using the side information.

As illustrated in FIG. 8, the LDPC channel code decoder 7800 may include an LLR computing unit 801 and an LDPC decoding unit 802.

The LDPC decoding unit 802 receives the parity data, the side information, the channel error estimation value for the side information, and the quantization strength information of each area. The LDPC decoding unit 802 performs LDPC decoding of the input signals to output reconstructed quantized WZ picture data.

Even though bits to be transmitted are not changed and quantization discard positions are filled with previously defined predetermined values such as 0 or 1, and thereafter WZ picture coding is performed as described above, it is advantages from a point of view of a bit rate. The reason is as follows. The channel code decoding unit, in particular, the LDPC channel code decoder 800 receives the channel error estimation information of bits to be decoded as described above. Based on the channel error estimation information, at the time of decoding, a weight of bits which are estimated as having small errors is increased, but a weight of bits which are estimated as having many errors is reduced. At this time, the channel error estimation information is not an accurate value since it is difficult to know an actual correlation between original information and side information. Therefore, when applied to an actual video, more parity data are required than a case of ideal decoding.

However, in the present invention, since the decoder knows in advance the fact that predetermined values such as 0 or 1 which have been known in advance are filled in the quantization discard positions, reliability of 100% can be secured with respect to decoding bit information at the positions. The decoder may know quantization discard position information with reference to the quantization strength of each area. The more bits having high reliability like 100% are, the more accurate channel code decoding like LDPC is, and the faster the decoding speed is.

For example, in the case of LDPC decoding using a BP decoding algorithm, an initial input LLR value is updated as propagation of the BP decoding algorithm proceeds. Since bits at the quantization discard positions which have been known in advance are high in reliability, the initial LLR value slightly varies in spite of repetitive computation. Therefore, the bits affect the surroundings so that LDPC decoding can be rapidly performed with high accuracy.

The reason that it affects bit-rate reduction to fill the quantization discard positions with predetermined bit values which are previously defined and using it at the time of decoding is also valid with respect to an average channel error. In general, in the channel coding decoder, as a difference between side information and original information is reduced, an average error is reduced, and as the side information having smaller errors is input, the errors can be completely removed using smaller parity data. However, the more an amount of the average error is, the more parity data is required for perfect decoding.

However, since the encoder can fill the quantization discard positions with predetermined values such as 0 or 1 and guarantee that there is no error in the positions at all, the more bits in which previously defined information is included, the more the average error may be reduced. Therefore, in this case, even though small parity data is received, more perfect decoding can be performed.

However, information representing original information of bits which are filled with 0 or 1, that is, parity data, is not transmitted, information distortion may occur. Information distortion is caused since information is discarded by quantization. Therefore, the quantization strength of each area needs to be determined to minimize information distortion.

The LLR computing unit 801 of FIG. 8 grasps the quantization discard positions with reference to the quantization strength of each area. For bits which do not correspond to the quantization discard positions, the LLR value is computed using the channel error estimation value of the side information, while for bits corresponding to the quantization discard positions, the LLR value which represents reliability of 100% may be used. An absolute value of the LLR value which represents reliability of 100% is infinity, and thus it may be set to an appropriate value which can be mathematically computed.

Figure 9:
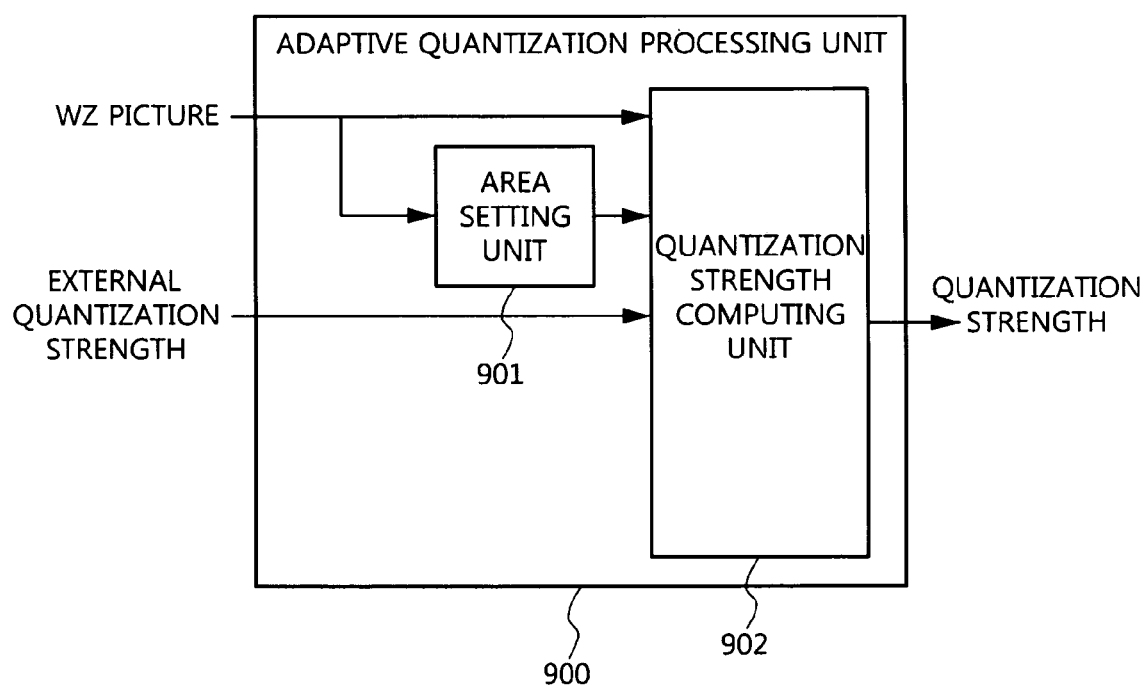
FIG. 9 is a block diagram illustrating an example of an adaptive quantization processing unit of the distributed video encoder of FIG. 6.

FIG. 9 is a block diagram illustrating an example of the adaptive quantization processing unit of the distributed video encoder of FIG. 6.

As illustrated in FIG. 9, an adaptive quantization processing unit 900 may include an area setting unit 901 and a quantization strength computing unit 902.

The area setting unit 901 analyzes input WZ picture information and classifies the WZ picture into one or a plurality of areas. The areas are a subset of the WZ picture which shares the same quantization strength value. The areas are preferably classified into an interest area and a non-interest area.

The interest area refers to an area which represents an important portion of a corresponding image such as a person portion in an image in which a person and a background are present together. On the contrary, the non-interest area may be set as a background portion. Of course, the interest area and the non-interest may be reversely set depending on an applied situation.

Alternatively, consecutive blocks having the same quantization strength in a point of view of predetermined rate-distortion optimization may be set as the same area. As a basic size of an area in which adaptive quantization of the same strength is performed is reduced, a bit rate is increased by quantization strength transmission, but quantization is adaptively performed for each area, while as a basic size of an area is increased, the bit rate required for quantization information transmission is reduced, but quantization is adaptively not performed for each area. For this reason, optimal area setting is performed using a predetermined rate-distortion relationship.

Area setting may be performed automatically using a previously input algorithm or by a user's manual input from the outside. When area setting is performed by the user's manual input and the quantization strength is determined by the user's input from the outside, the adaptive quantization processing unit may be configured to operate without receiving WZ picture information.

Information representing spatial definition of an area such as a location, a size, and a shape of an area set by the area setting unit 901 is signaled to the decoder. However, when areas are set according to a certain pattern which is previously defined, information representing spatial definition of an area may not be signaled to the decoder.

As another implementation of the area setting unit 901, the decoder 630 may be configured to perform area setting and transmit area setting to the encoder 610. In this case, the area setting unit 901 sets an area using area information received from the decoder 630 without analyzing WZ picture information to set an area.

The quantization strength computing unit 902 computes the quantization strength with reference to a characteristic of the input WZ picture. The quantization strength computing unit 902 may be configured to compute the quantization strength which has an excellent performance from a point of view of bit rate-distortion. The quantization strength computing unit 902 may be configured to use a quantization strength value input from the outside "as is".

Depending on an application, the quantization strength computing unit 902 may receive the quantization strength computed by the decoder 630 and computes the quantization strength with reference to the quantization strength received from the decoder 630. This implementation is illustrated in FIG. 10.

Figure 10:
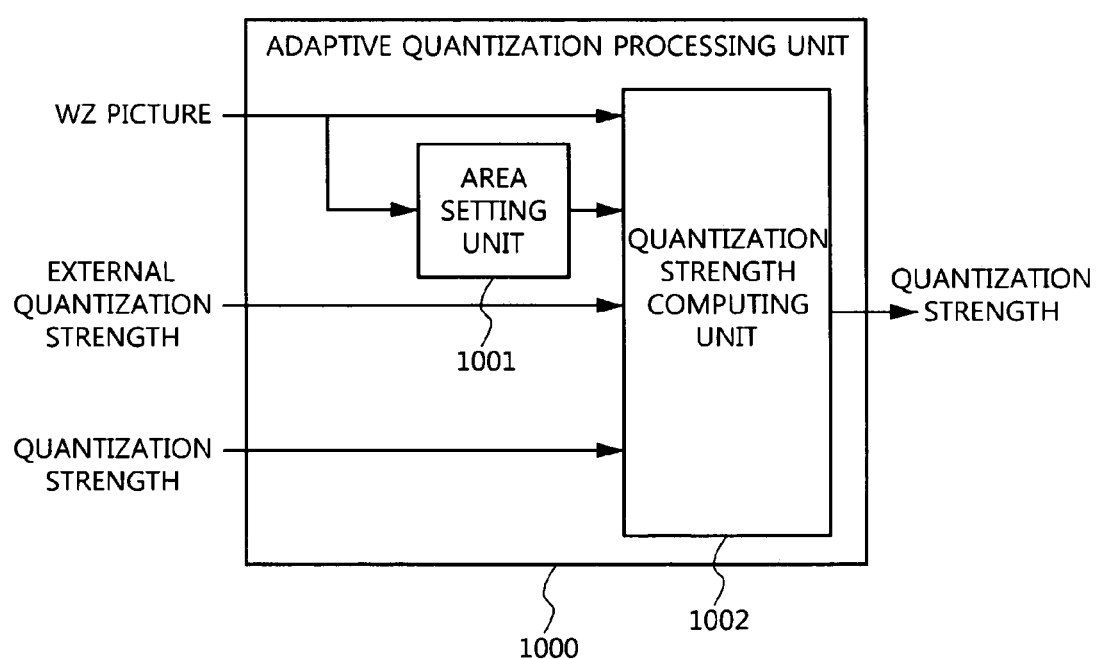
FIG. 10 is a view illustrating another example of an adaptive quantization processing unit of the distributed video encoder of FIG. 6.

FIG. 10 is a view illustrating another example of the adaptive quantization processing unit of the distributed video encoder of FIG. 6.

A quantization strength computing unit 1002 of an adaptive quantization processing unit 1000 of FIG. 10 may compute the quantization strength with reference to the quantization strength value received from the decoder 630. Alternatively, the encoder 610 and the decoder 610 may cooperate with each other to determine the quantization strength.

The quantization strength of each area computed by the adaptive quantization processing unit 900 or 1000 is used by the encoder 610 and transmitted to the decoder 630. The decoder 630 uses the same quantization strength as in the encoder 610 for each area.

Depending on an implementation, the decoder 630 may compute and use the quantization strength and transmit the computed quantization strength to the encoder 610. In this case, the encoder 610 and the decoder 630 use a single value as the quantization strength. Similarly, even when the encoder 610 and the decoder 630 cooperate to compute the quantization strength, the same quantization strength which is finally computed is used in both the encoder 610 and the decoder 630.

For the same area, the quantization strength computed by the encoder 610 is preferably the same as the quantization strength used by the decoder 630. However, different values may be used according to an application.

Figure 11:
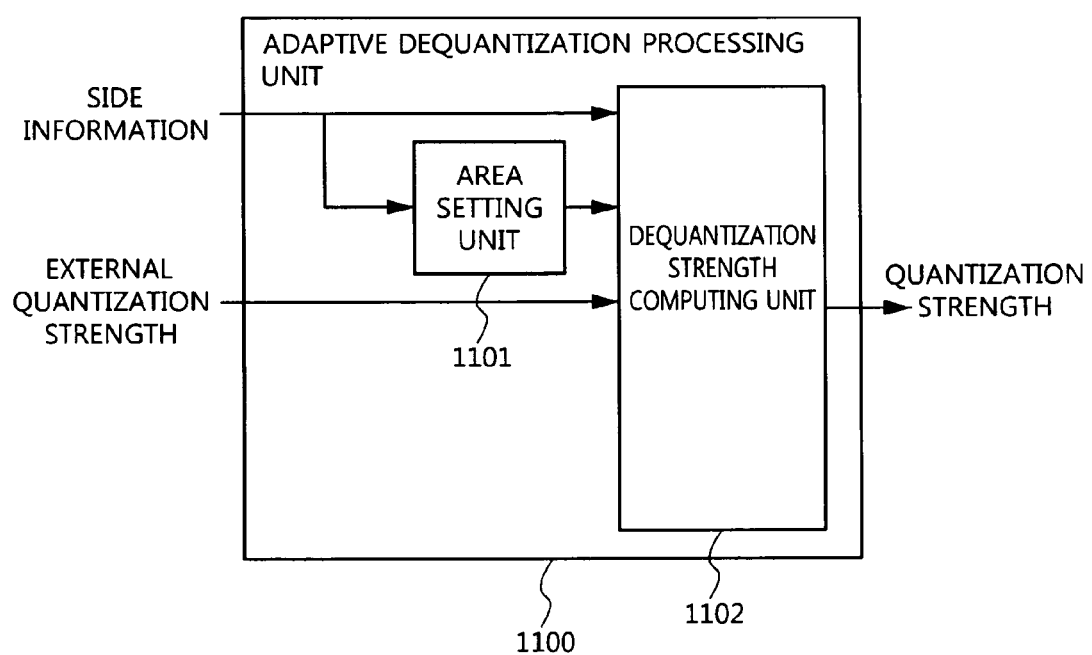
FIG. 11 is a block diagram illustrating one example of an adaptive dequantization processing unit of the distributed video decoder of FIG. 6.

FIG. 11 is a block diagram illustrating one example of the adaptive dequantization processing unit of the distributed video decoder of FIG. 6.

An adaptive dequantization processing unit 1100 includes an area setting unit 1101 and a dequantization strength computing unit 1102.

The area setting unit 1101 of the adaptive dequantization processing unit 1100 sets an area in which adaptive dequantization is performed. That is, the area setting unit 1101 sets one area or a plurality of areas which share the same quantization strength.

Information of an area to be set may be transmitted from the encoder 610 through predetermined signaling. However, according to a case, the decoder 630 may set area setting information without receiving it from the encoder 610 and then transmit it to the encoder 610. To this end, the area setting unit 1101 of FIG. 11 may analyze the side information to set areas to be used. Further, the area setting unit 1101 may be configured to use a certain pattern which is previously determined. The quantization strength to be used may be received from the outside as in the adaptive quantization processing units 900 and 1000.

Figure 12:
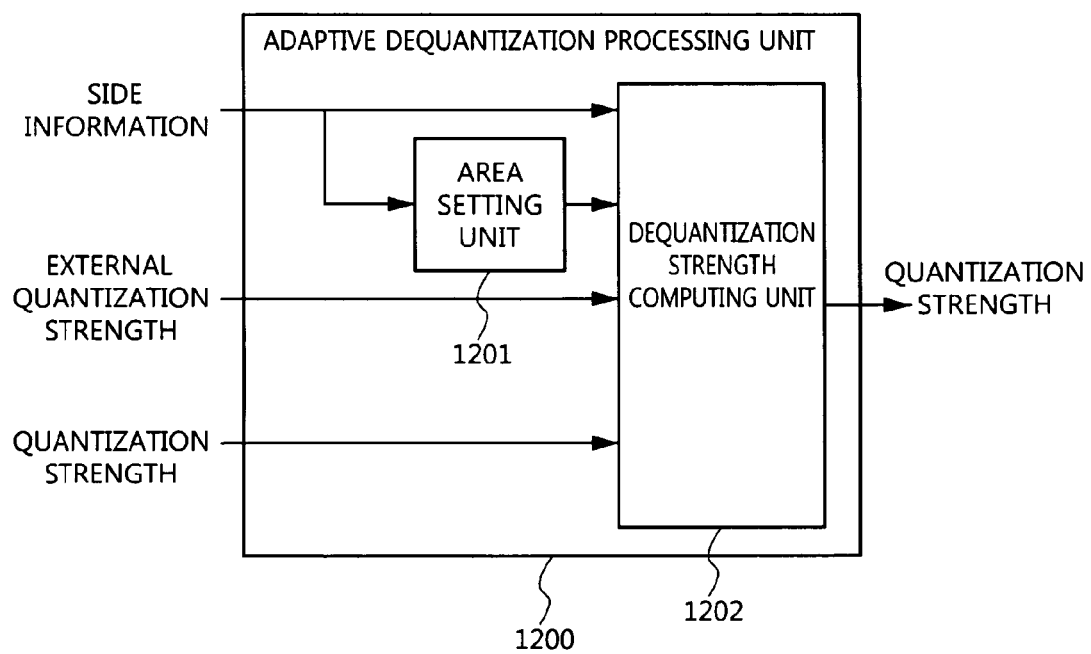
FIG. 12 is a block diagram illustrating another example of an adaptive dequantization processing unit of the distributed video decoder of FIG. 6.

FIG. 12 is a block diagram illustrating another example of the adaptive dequantization processing unit of the distributed video decoder of FIG. 6.

The adaptive dequantization processing unit 1200 of FIG. 12 further includes a function of receiving the quantization strength from the encoder 610 compared to the adaptive dequantization processing unit 1100.

The adaptive dequantization processing unit 1200 of FIG. 12 performs communication with the encoder 610 to receive the quantization strength of the encoder 610 and computes the quantization strength of the decoder 630. Further, the adaptive dequantization processing unit 1200 may transmit the quantization strength information used by the decoder 630 to the encoder 610 so that the encoder 610 can compute the quantization strength.

Figure 13:
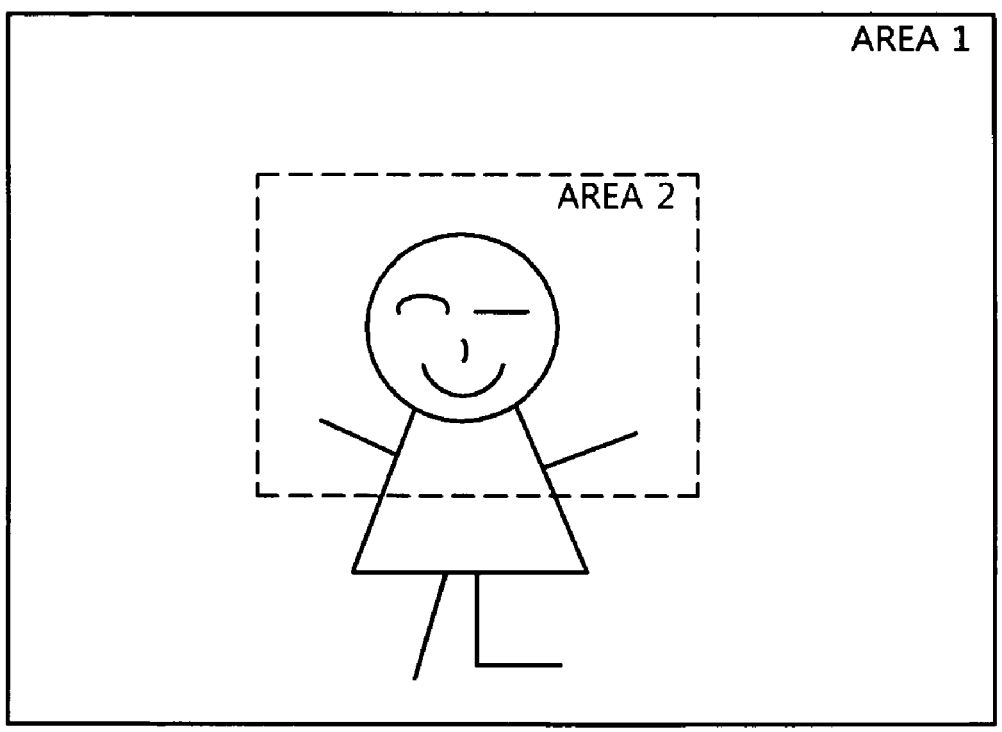
FIG. 13 is a view for explaining an effect of distributed vide coding using adaptive quantization for an interest area.

FIG. 13 is a view for explaining an effect of distributed vide coding using adaptive quantization for the interest area.

An image of FIG. 13 includes an area 1 and an area 2. The area 2 includes a face of a person, and the area 1 includes a portion excluding the area 2 from an overall image, that is, a background.

The area 2 is set as the interest area, and the area 1 is set as the non-interest area. For the interest area, low quantization strength is used to allocate many bits, thereby improving the image quality. For the non-interest area, since it does not matter even though the image quality slightly deteriorates, high quantization strength is used to allocate small bits, thereby maximizing the compression effect.

In FIG. 13, the overall image is divided into two areas, that is, the interest area and the non-interest area, according to an interest degree. The person skilled in the art can understand that the overall image may be divided into three or more areas according to an interest degree.

In the above-described embodiment, relatively weak quantization is applied to the interest area compared to the non-interest area, but the opposite situation may be considered. For example, for the interest area which is desired to be hidden, stronger quantization may be performed to compulsorily reduce a transmission amount of information.

As another embodiment related to this, when the technique of the present invention is applied to expressway speed violation cameras, for the interest area including a driver's face, weak quantization may be performed to include many information, while for the interest area including a companion's face on a passenger seat, strong quantization may be performed to include as small information as possible.

The interest area does not need to be defined by a rectangle as illustrated in FIG. 13. The interest area may be defined by other polygons as well as a rectangle. Diagrams for defining the interest area may be various according to accuracy and efficiency of interest area setting.

As described above, in the encoder and decoder and the decoding method according to the present invention, quantization of appropriate strength is performed for each area of an image, thereby improving a bit rate-distortion performance of an overall image. For the sake of distributed video coding, differentiated quantization for an interest area can be performed. According to the present invention, positions of bits which are discarded by quantization are filled with bits which are previously defined to configure a message of a predetermined length, thereby resolving the problem of the conventional art.

The encoder and decoder according to the present invention have the following advantages. Firstly, channel coding and decoding can be performed by using a fixed channel coding code rate. Secondly, even though adaptive quantization is performed, a message of a constant length can be configured in bit planes units, and thus channel decoding of bit plane units can be performed. Correlation information present between bit planes can be used by channel decoding of bit plane units, and thus an image can be reconstructed with a smaller bit rate. Thirdly, an average error rate of each bit plane is constantly maintained, and thus it is beneficial to distributed vide coding using a channel coding method in which a decoding performance is reduced when a burst error or the dispersion of an error rate of each bit location of a message is increased. Fourthly, since bits which do not have to be transmitted are replaced with bits which are previously defined, the encoder does not have to bind bits to be transmitted to make a message of a constant length, and the decoder does not have to recombine a reconstructed message to recombine data of bit plane units.

While the example embodiments of the present invention and their advantages have been described in detail, it should be understood that various changes, substitutions and alterations may be made herein without departing from the scope of the invention.

What is claimed is:

1. A distributed video encoder, comprising:
   a key picture encoding unit which encodes a key picture and outputs an encoded key picture;
   a block unit dividing unit which divides a WZ picture into predetermined coding units;
   an adaptive quantization processing unit which determines quantization strength of each area using coding unit information;
   an adaptive quantization unit which performs quantization of the coding unit information output from the block unit dividing unit with the determined quantization strength of each area; and
   a channel code encoding unit which channel-codes the quantized coding unit information in a bit plane unit and outputs parity data,
   wherein the distributed video encoder is configured to identify quantization discard positions based on the quantization strength of each area and fill the quantization discard positions with a predetermined bit value.

2. A distributed video decoder, comprising:
   a key picture decoding unit which decodes an encoded key picture and outputs a decoded key picture;
   a side information generating unit which generates side information using the decoded key picture;
   an adaptive dequantization processing unit which determines quantization strength of each area using quantization strength information which is shared with an encoder;
   a channel code decoding unit which identifies quantization discard positions and estimates a quantized value using the side information generated by the side information generating unit, the quantization strength determined by the adaptive dequantization strength processing unit, parity data input from the outside and the quantization discard positions filled with a predetermined bit value based on the quantization strength of each area;
   an adaptive dequantization unit which computes a dequantized value using the quantization strength of each area and the estimated quantized value; and
   a video reconstruction unit which reconstructs a WZ picture using the computed dequantized value, and the side information.

3. The distributed video decoder of claim 2, wherein the quantization strength information comprises the side information input from the side information generating unit.

4. A distributed video decoding method, comprising:
   receiving parity data and an encoded key picture;
   decoding the encoded key picture and outputting a decoded key picture;
   generating side information using the decoded key picture;
   determining quantization strength of each area using quantization strength information which is shared with an encoder;
   estimating a quantized value using the side information, the quantization strength, the parity data and the quantization discard positions filled with a predetermined bit value based on the quantization strength of each area
   computing a dequantized value using the quantization strength of each area and the estimated quantized value; and
   reconstructing a WZ picture using the computed dequantized value and the side information.

5. The distributed video decoding method of claim 4, wherein the quantization strength information comprises the side information input from the side information generating unit.

* * * * *